(12) United States Patent
Chan

(10) Patent No.: US 10,595,662 B2
(45) Date of Patent: Mar. 24, 2020

(54) SOUS-VIDE IMMERSION ELECTRONIC CIRCULATOR COOKER

(71) Applicant: PUC Perfect Union Co., Ltd., New Taipei (TW)

(72) Inventor: Ching Chan, New Taipei (TW)

(73) Assignee: PUC Perfect Union Co., Ltd., New Taipei (TW)

( * ) Notice: Subject to any disclaimer, the term of this patent is extended or adjusted under 35 U.S.C. 154(b) by 337 days.

(21) Appl. No.: 15/607,997

(22) Filed: May 30, 2017

(65) Prior Publication Data

US 2018/0344069 A1 Dec. 6, 2018

(51) Int. Cl.
| | |
|---|---|
| A47J 27/00 | (2006.01) |
| A47J 27/10 | (2006.01) |
| A47J 27/21 | (2006.01) |
| H05B 3/80 | (2006.01) |
| F24H 1/06 | (2006.01) |

(52) U.S. Cl.
CPC ......... *A47J 27/10* (2013.01); *A47J 27/21016* (2013.01); *A47J 27/21033* (2013.01); *F24H 1/06* (2013.01); *H05B 3/80* (2013.01)

(58) Field of Classification Search
CPC .................. A47J 27/10; A47J 27/21016; A47J 27/21033; H05B 3/80; F24H 1/06
USPC .......................................... 99/348, 330, 409
See application file for complete search history.

(56) References Cited

U.S. PATENT DOCUMENTS

| | | | | |
|---|---|---|---|---|
| 2013/0220143 | A1* | 8/2013 | Fetterman | A47J 36/2405 99/330 |
| 2016/0022085 | A1* | 1/2016 | Wu | H05B 3/80 99/330 |
| 2016/0037956 | A1* | 2/2016 | Wu | A47J 27/10 99/403 |
| 2016/0192801 | A1* | 7/2016 | Wu | A47J 27/10 426/231 |

* cited by examiner

*Primary Examiner* — Reginald Alexander
(74) *Attorney, Agent, or Firm* — Jackson IPG PLLC; Demian K. Jackson

(57) ABSTRACT

A sous-vide circulator cooker includes a casing including a front shell and a rear shell; a wheel control device, a temperature limiting thermostat, a circuit board for controlling switch, a mechanical fan for drawing cold air in and expelling hot air out, a main circuit board configured to activate heating and agitation; a drive source for agitation and testing, a support for heating member, an electric heating member, a fan blade assembly, a lower case section configured to store a quantity of liquid which is configured to be agitate by the fan blade assembly, an inlet device including, a fastening assembly, and an AC power cord for supplying power to electrical components of the circulator cooker.

1 Claim, 5 Drawing Sheets

SOUS-VIDE IMMERSION ELECTRONIC CIRCULATOR COOKER

BACKGROUND OF THE INVENTION

1. Field of the Invention

The invention relates to food cooking devices and more particularly to a sous-vide immersion electronic circulator cooker with improved characteristics.

2. Description of Related Art

Sous-vide is a method of cooking in which food is vacuum-sealed in a plastic pouch and then placed in a water bath or steam environment for longer than normal cooking times, usually 1 to 7 hours, at an accurately regulated temperature much lower than normally used for cooking, typically around 55 to 60° C. for meat, higher for vegetables). The intent is to cook the item evenly, ensuring that the inside is properly cooked without overcooking the outside, and to retain moisture.

Sous-vide circulator cookers are well known in the art. For example, US Publication Number 20160022085 A1 to Wu et al. discloses a sous-vide circulator cooker for home sous-vide cooking. Also, US Publication Number 20160192801 A1 to Wu discloses a circulator cooker for sous-vide cooking.

While the device enjoys its success in the market, continuing improvements in the exploitation of sous-vide circulator cooker of this type are constantly being sought.

SUMMARY OF THE INVENTION

It is therefore one object of the invention to provide a circulator cooker comprising a casing comprising a front shell including a window, two spaced first recesses on a lower end, a first groove on an inner surface, the first groove being above and adjacent to the first recesses, a circuit board secured to the window, a panel display secured to the window, a plurality light guide members electrically connected to the circuit board, and a transparent touchscreen secured to the window and spaced from the circuit board; and a rear shell including a top opening, a plurality of lower openings, a plurality of upper openings, a mount member secured to an outer surface, two spaced second recesses on a lower end, and a second groove on an inner surface, the second groove being above and adjacent to the second recesses; a wheel control device disposed in the casing and including a seat, a wheel disposed in the seat, and a hollow fastening member secured to the seat so that the wheel projects out of the top opening; a temperature limiting thermostat disposed in the casing and including a temperature probe; a circuit board for controlling switch; a mechanical fan for drawing cold air from the lower openings and expelling hot air out of the casing via the upper openings; a main circuit board disposed in the casing and configured to activate heating and agitation; a drive source for agitation and testing disposed in the casing and including a motor, a motor shaft extending downward from the motor, and two probes for sensing temperature and for measuring water level respectively; a support for heating member disposed on a bottom of the casing and including an annular flange positioned in the first and second grooves seal the bottom of the casing; an electric heating member disposed in the casing and extending downward from the flange wherein the motor shaft, the probes for sensing temperature and for measuring water level, and the temperature probe pass the support for heating member to be proximate the electric heating member; a fan blade assembly fastened at a bottom end of the motor shaft wherein the temperature probe and the electric heating member are fastened together; a ground having one end connected to the electric heating member; a hollow cylindrical lower case section configured to store a quantity of liquid which is configured to be agitate by the fan blade assembly, the lower case section including a plurality of spaced projections on an inner surface configured to dispose in the first and second recesses for fasten the casing and the lower case section together, a vertical opening for flowing liquid off, and a plurality of horizontal openings for flowing liquid off; an inlet device including a plurality of inlets for flowing liquid in, and a rib formed on an outer surface; a fastening assembly including a resilient member, an anti slip sleeve put on a lower portion of the fastening assembly and secured to the lower case section, and a cover secured to the mount member by pressing an upper portion of the fastening assembly and the resilient member against a back of the mount member; and an AC power cord having one end passing through the cover to electrically connect to the main circuit board for supplying power thereto; wherein the circuit board is configured to control the main circuit board.

The above and other objects, features and advantages of the invention will become apparent from the following detailed description taken with the accompanying drawings.

DETAILED DESCRIPTION OF THE INVENTION

Figure 1:
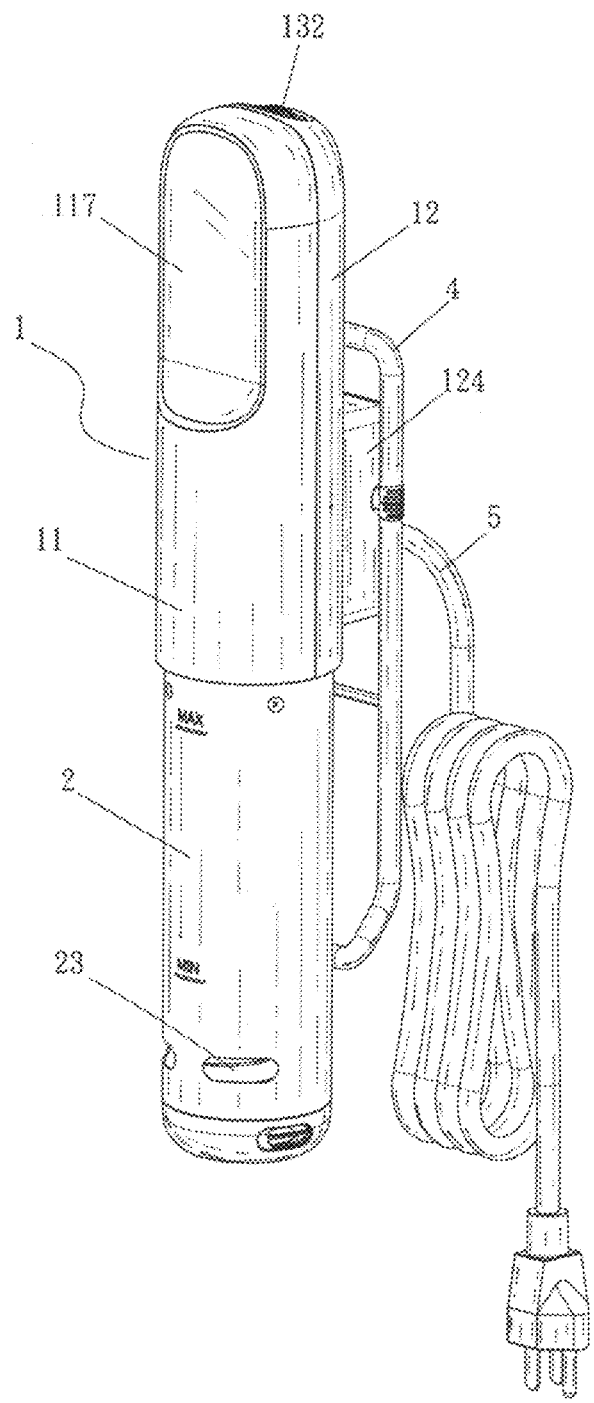
FIG. 1 is a perspective view of a sous-vide immersion electronic circulator cooker according to the invention.
Figure 2:
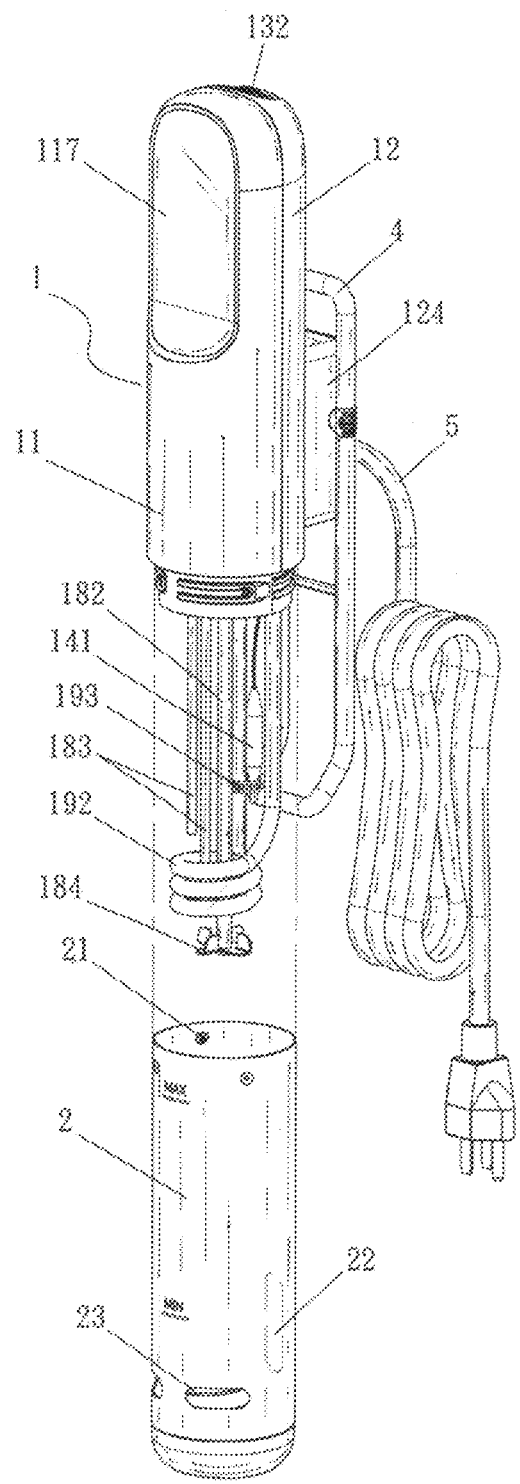
FIG. 2 is a view similar to FIG. 1 with the lower case section detached.
Figure 3:
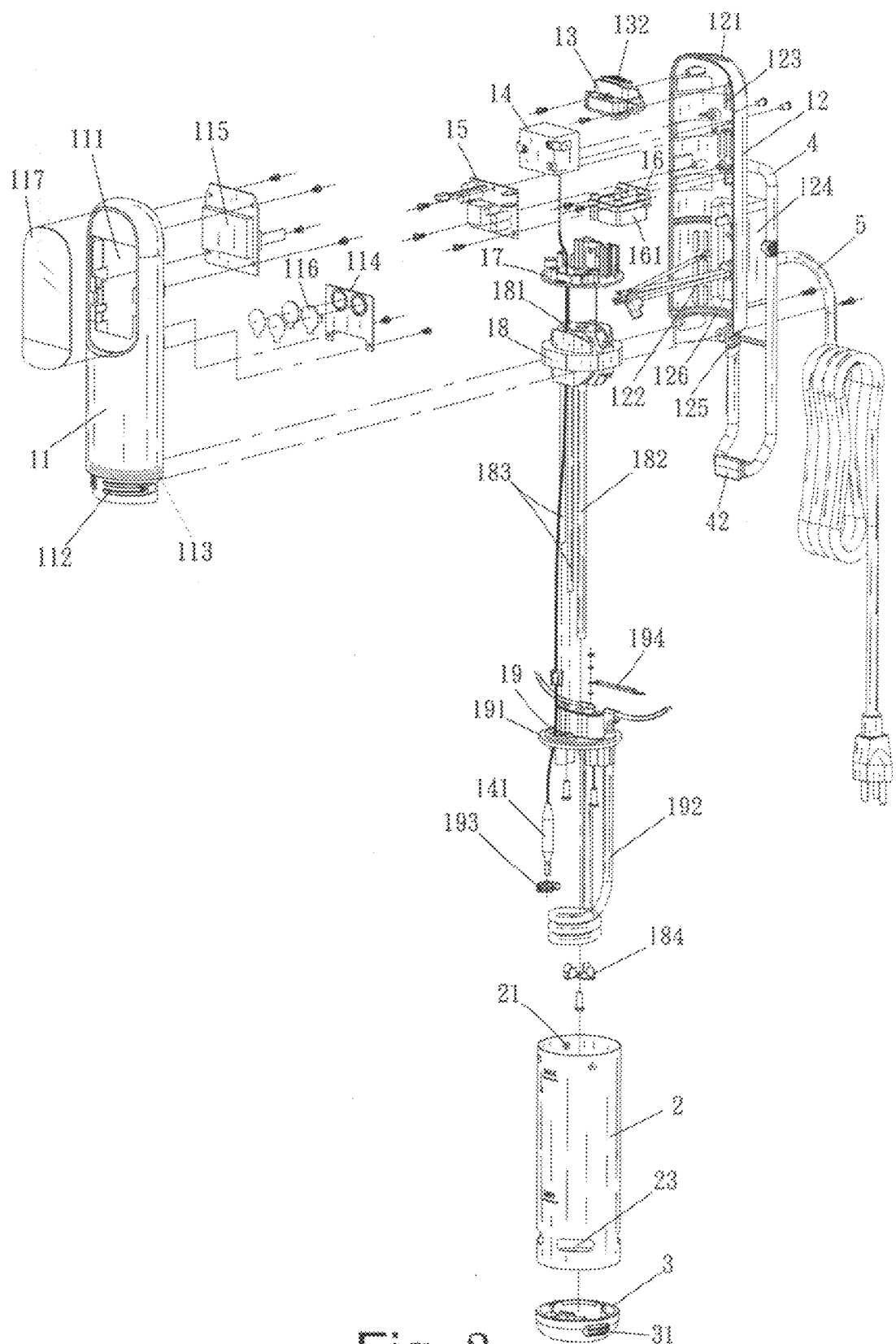
FIG. 3 is an exploded view of the electronic circulator cooker.
Figure 4:
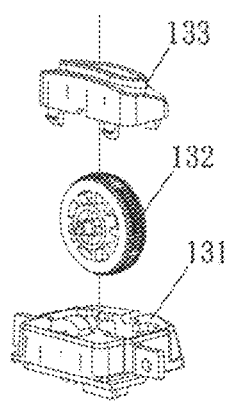
FIG. 4 is an exploded view of the wheel control device.
Figure 5:
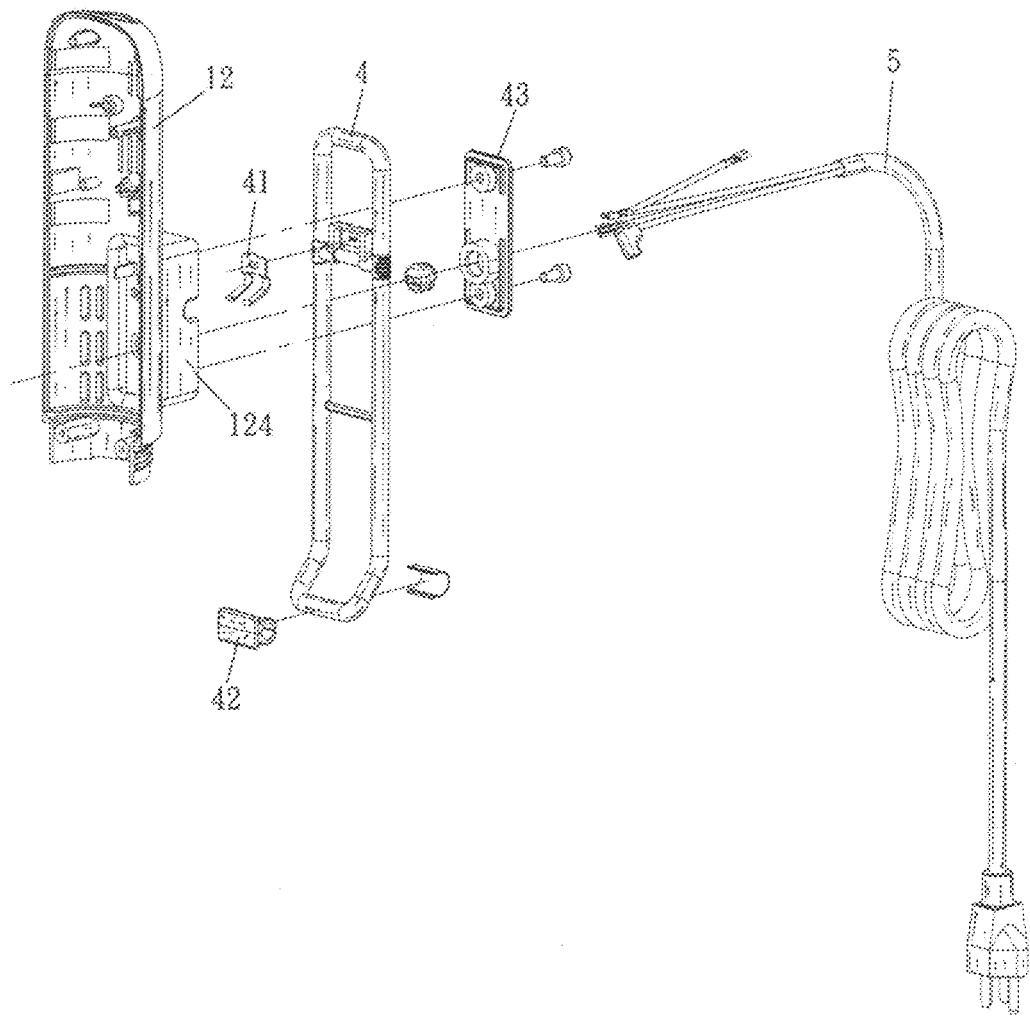
FIG. 5 is an exploded view of the components shown in the right side of FIG. 3.
Figure 6:
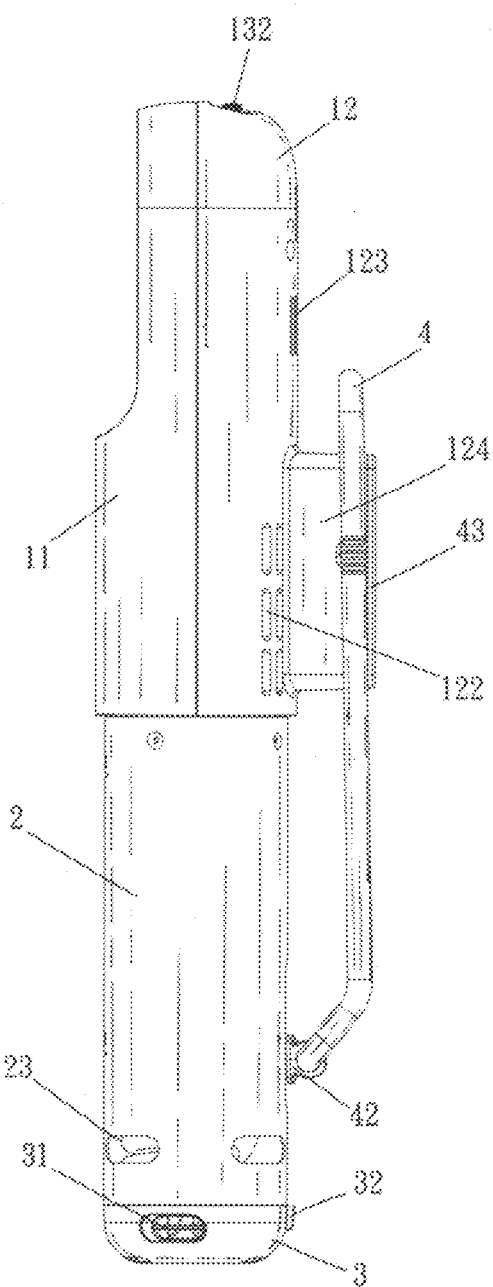
FIG. 6 is a side elevation of FIG. 1.
Figure 7:
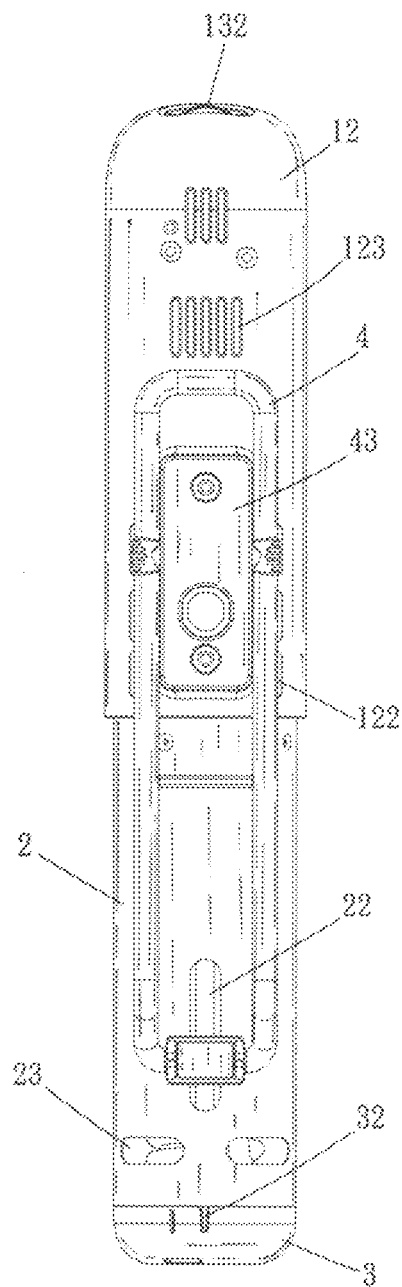
FIG. 7 is a rear view of FIG. 1.

Referring to FIGS. 1 to 7, a sous-vide immersion electronic circulator cooker in accordance with the invention comprises the following components as discussed in detail below.

A casing 1 includes a front shell 11 and a rear shell 12 detachably secured to the front shell 11 as detailed below. The casing 1 has a bottom opening. The front shell 11 includes a window 111, two spaced recesses 112 on a lower end, a groove 113 on an inner surface, the groove 113 being above and adjacent to the recesses 112, a circuit board 114 secured to the window 111, a panel display 115 also secured to the window 111, a plurality light guide members 116 electrically connected to the circuit board 114, and a transparent touchscreen 117 secured to the window 111 and spaced from the circuit board 114.

The rear shell 12 includes a top opening 121, a plurality of lower openings 122, a plurality of upper openings 123, a mount member 124 secured to an outer surface, two spaced recesses 125 on a lower end, and a groove 126 on an inner surface, the groove 126 being above and adjacent to the recesses 125.

Within the casing 1 there are provided a wheel control device 13, a temperature limiting thermostat 14, a circuit board 15 for controlling switch, a fan mount 16, a main circuit board 17, a drive source 18 for agitation and testing, and a support 19 for heating member.

The wheel control device 13 includes a seat 131, a wheel 132 disposed in the seat 131, and a hollow fastening member 133 secured to the seat 131 with the wheel 132 projecting out of its open top and further projecting out of the top opening 121. The temperature limiting thermostat 14 functions to limit temperature to a desired range. The temperature limiting thermostat 14 includes a temperature probe 141 electrically connected to the temperature limiting thermostat 14.

The circuit board 15 for controlling switch is electrically connected to a wire 5 which is in turn configured to connect to an outlet. A mechanical fan 161 is mounted on the fan mount 16 for drawing cold air from the lower openings 122 and expelling hot air out of the casing 1 via the upper openings 123. The main circuit board 17 acts to activate heating and agitation. The drive source 18 for agitation and testing includes a motor 181, a motor shaft 182 extending downward from the motor 181, and two probes 183 for sensing temperature and for measuring water level respectively. The support 19 for heating member is provided on a bottom of the casing 1 and includes an annular flange 191 positioned in the grooves 113, 126 to seal the bottom of the casing 1, and an electric heating member 192 extending downward from the flange 191. The motor shaft 182, the probes 183 for sensing temperature and for measuring water level, and the temperature probe 141 of the temperature limiting thermostat 14 pass the support 19 for heating member to be proximate the electric heating member 192. A fan blade assembly 184 is fastened at a bottom end of the motor shaft 182. A cable tie 193 is provided to fasten the temperature probe 141 and the electric heating member 192 together so that the temperature probe 141 may measure the temperature of the electric heating member 192. A ground 194 has one end connected to the electric heating member 192.

The hollow cylindrical lower case section 2 has an open top and is configured to store a quantity of liquid. The lower case section 2 includes four equally spaced projections 21 on an inner surface configured to dispose in the recesses 112 and 125 for fasten the casing 1 and the lower case section 2 together. The lower case section 2 further comprises a vertical opening 22 for flowing liquid off, and a plurality of horizontal openings 23 adjacent to the bottom for flowing liquid off. An inlet device 3 includes a plurality of inlets 31 for flowing water in, and a rib 32 on an outer surface. A fastening assembly 4 includes a resilient member 41, an anti slip sleeve 42 put on a lower portion of the fastening assembly 4 and secured to the lower case section 2, and a cover 43 secured to the mount member 124 by pressing an upper portion of the fastening assembly 4 and the resilient member 41 against the back of the mount member 124. An AC (alternating current) power cord 5 has one end passing through the cover 43 to electrically connect to the main circuit board 17 for supplying power thereto. Consequently, power can be supplied from the main circuit board 17 to all electrical components of the invention. Further, the circuit board 114 is configured to control the main circuit board 17 for setting, operating, sensing, measurement, and information display.

While the invention has been described in terms of preferred embodiments, those skilled in the art will recognize that the invention can be practiced with modifications within the spirit and scope of the appended claims.

What is claimed is:

1. A circulator cooker comprising:
a casing comprising a front shell including a window, two spaced first recesses on a lower end, a first groove on an inner surface, the first groove being above and adjacent to the first recesses, a circuit board secured to the window, a panel display secured to the window, a plurality of light guide members electrically connected to the circuit board, and a transparent touchscreen secured to the window and spaced from the circuit board; and a rear shell including a top opening, a plurality of lower openings, a plurality of upper openings, a mount member secured to an outer surface, two spaced second recesses on a lower end, and a second groove on an inner surface, the second groove being above and adjacent to the second recesses;
a wheel control device disposed in the casing and including a seat, a wheel disposed in the seat, and a hollow fastening member secured to the seat so that the wheel projects out of the top opening;
a temperature limiting thermostat disposed in the casing and including a temperature probe;
a controlling switch circuit board;
a mechanical fan for drawing cold air from outside the lower openings and expelling hot air out of the casing via the upper openings;
a drive source for agitation and testing disposed in the casing and including a motor, a motor shaft extending downward from the motor, and two probes for sensing temperature and for measuring water level respectively;
a main circuit board disposed in the casing and configured to activate heating and agitation;
an electric heating member disposed in the casing and extending downward from the flange wherein the motor shaft, the probes for sensing temperature and for measuring water level, and the temperature probe pass the support for heating member to be proximate the electric heating member;
a support for the electric heating member disposed on a bottom of the casing and including an annular flange positioned in the first and second grooves seal the bottom of the casing;
a fan blade assembly fastened at a bottom end of the motor shaft wherein the temperature probe and the electric heating member are fastened together;
a ground having one end connected to the electric heating member;
a hollow, cylindrical lower case section configured to store a quantity of liquid which is configured to be agitated by the fan blade assembly, the lower case section including a plurality of spaced projections on an inner surface configured to dispose in the first and second recesses for fastening the casing and the lower case section together, a vertical opening configured to allow liquid to flow therethrough when the circulator cooker is immersed in liquid, and a plurality of horizontal openings configured to allow liquid to flow therethrough when the circulator cooker is immersed in liquid;
an inlet device connected to a lower end of the lower case section, the inlet device including a plurality of inlets configured to allow liquid to flow therethrough when the circulator cooker is immersed in liquid, and a rib formed on an outer surface;

a fastening assembly including a resilient member, an anti slip sleeve put on a lower portion of the fastening assembly and secured to the lower case section, and a cover secured to the mount member by pressing an upper portion of the fastening assembly and the resilient member against a back of the mount member; and an AC (alternating current) power cord having one end passing through the cover to electrically connect to the main circuit board for supplying power thereto;

wherein the circuit board is configured to control the main circuit board.

\* \* \* \* \*